June 12, 1951  I. A. PAIGE  2,556,977
ELECTRIC OUTLET AND BOX CONSTRUCTION
Filed July 14, 1949  2 Sheets-Sheet 1
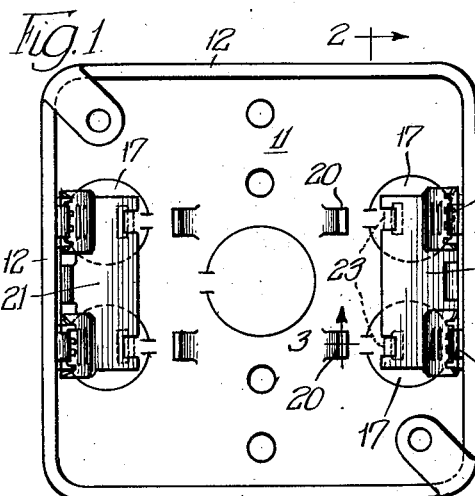
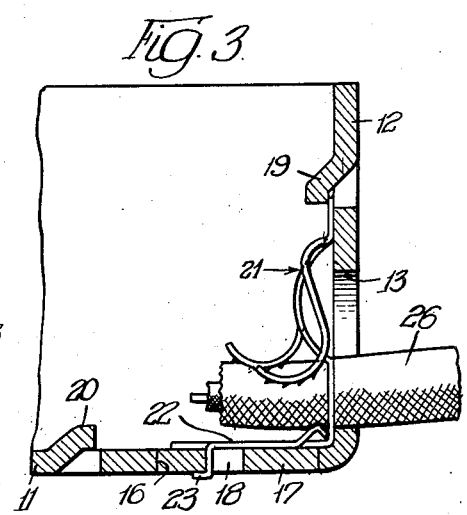
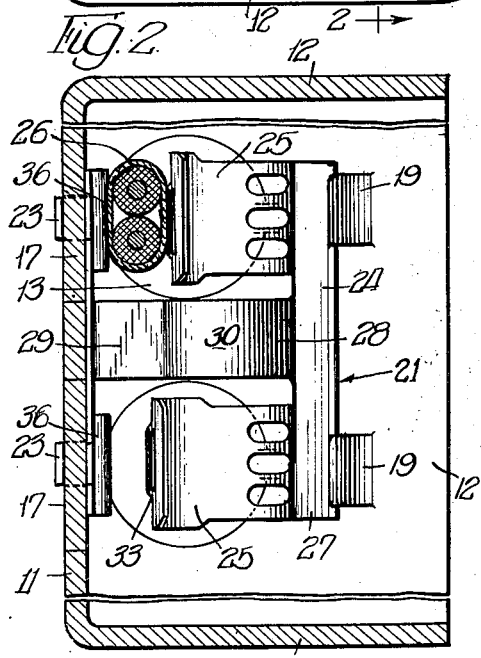
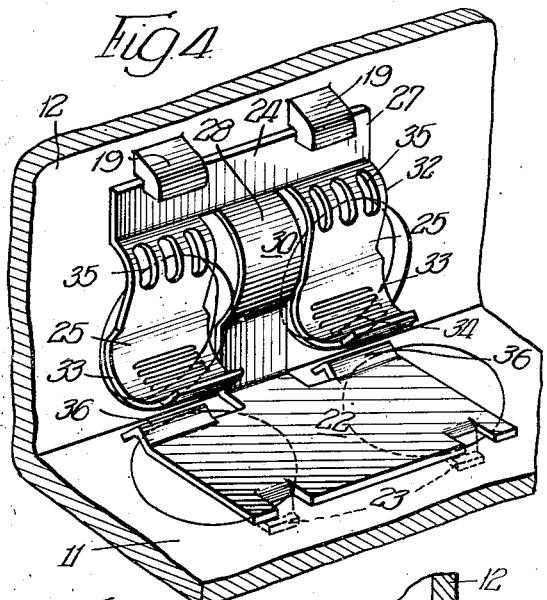
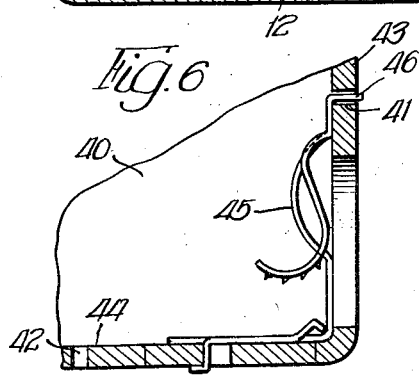
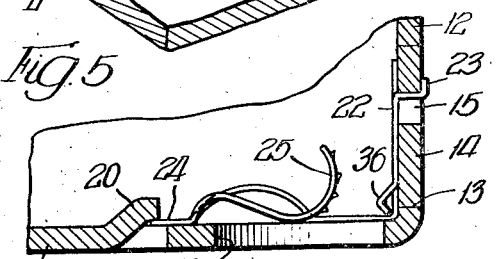
INVENTOR.
Isaac A. Paige,
BY
Cromwell, Greist & Warden
ATTYS.

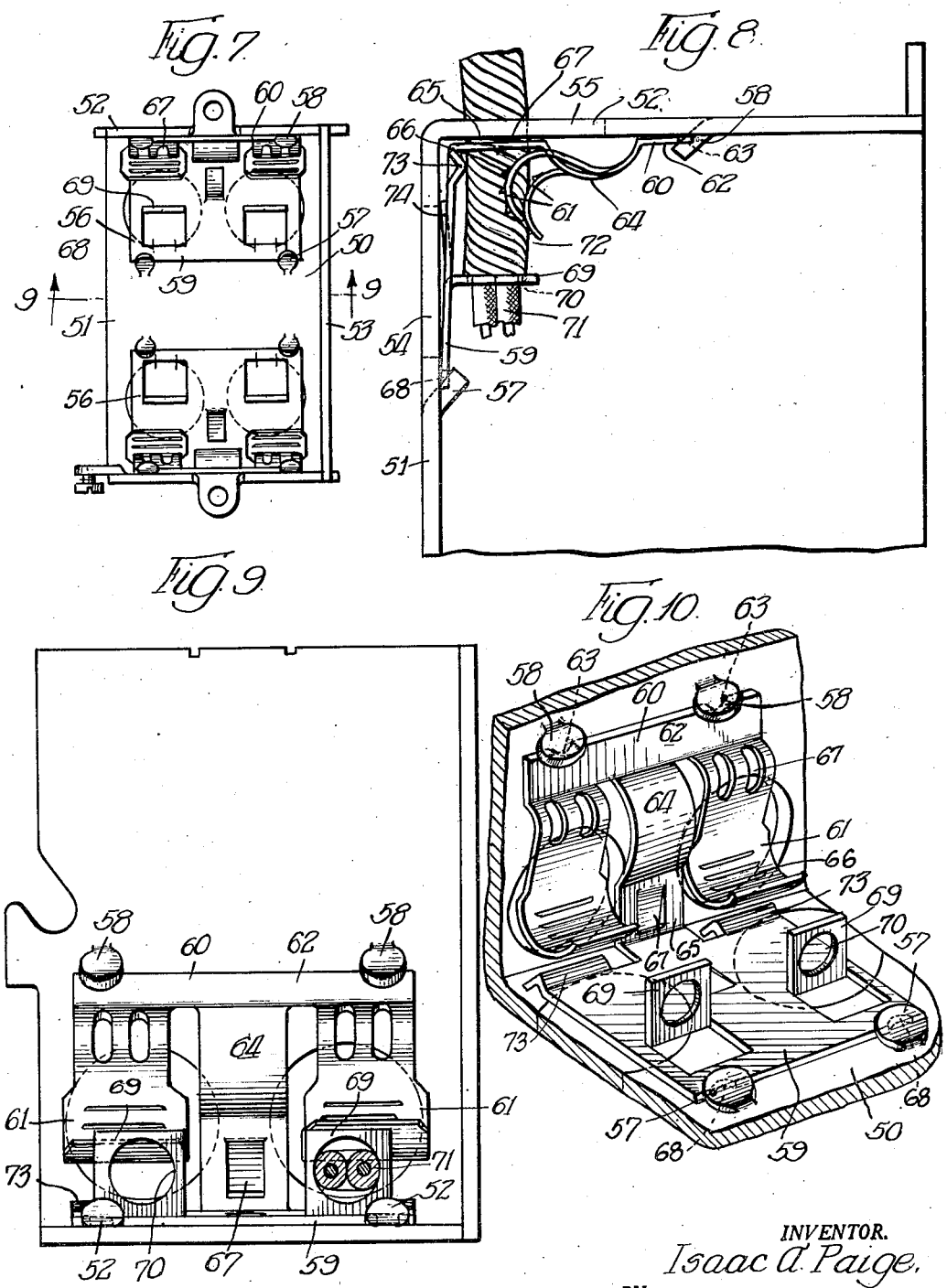

Patented June 12, 1951

2,556,977

UNITED STATES PATENT OFFICE 2,556,977

ELECTRIC OUTLET AND BOX CONSTRUCTION

Isaac A. Paige, Chicago, Ill.

Application July 14, 1949, Serial No. 104,718

13 Claims. (Cl. 285—24.5)

1

This invention relates to electrical outlet and switch box constructions and is particularly concerned with improvements in means for securing an electrical conduit or cable in a knockout hole in the box.

A general object of the invention is to provide an electrical outlet or switch box in combination with a connector member for securing an electrical conduit in the knockout hole of the box whereby the connector member may be easily and quickly secured in the outlet box in proper position to secure the conduit therein.

It is a more specific object of the invention to provide an improved outlet or switch box and cooperating connector member wherein the connector member is constructed of resilient material and provided with portions adapted to be engaged in interlocking relation with portions of the box and also provided with other portions adapted to engage the electrical conduit and resiliently retain the same in position in the box.

A still more specific object of the invention is to provide an improved outlet or switch box and a connector member wherein the connector member comprises an integral one-piece spring metal angle member which is secured in the outlet or switch box in alignment with a knockout hole therein and which is provided with resilient means for engagement with a fabric or metal covered conduit passing through the knockout hole.

Another object of the invention is to provide a one-piece angular connector member for use in an outlet or switch box of the type having knockout holes in adjoining bottom and side or end walls, which connector member is provided with a spring finger for resilient engagement with a conduit passing through a knockout hole in the box, the connector member and the outlet or switch box being so constructed that the connector member may be placed in the box in alternate positions to secure a conduit therein which is passed through a knockout hole in one or the other of adjoining walls of the box.

These and other objects and advantages will be apparent from a description of the preferred forms of the invention which are shown by way of illustration in the accompanying drawings, wherein:

Fig. 1 is a plan view of an electrical outlet box having two connector members secured therein which embodies the principles of the invention;

Fig. 2 is a section taken on the line 2—2 of Fig. 1 to an enlarged scale and with portions broken away;

2

Fig. 3 is a section taken on the line 3—3 of Fig. 1 to an enlarged scale;

Fig. 4 is a perspective view of a connector member secured in the outlet box with portions of the box broken away;

Fig. 5 is a section similar to Fig. 3 but showing the connector member in alternate position to secure a cable in the knockout hole in the adjoining wall of the box;

Fig. 6 is a section similar to Fig. 3 but showing a modified form of the invention;

Fig. 7 is a plan view of an electrical switch box having two conduit connector members therein which illustrates a modified form of the invention;

Fig. 8 is a side elevation of a portion of the switch box, to an enlarged scale;

Fig. 9 is a section taken on the line 8—8 of Fig. 7 to an enlarged scale; and

Fig. 10 is a perspective view of a connector member secured in the switch box with portions of the box broken away.

Referring to the drawings, Figs. 1 to 6, there is illustrated an outlet box 10 of the type which comprises a bottom 11 and four side walls 12 arranged to provide a generally rectangular open-faced receptacle. Two opposed side walls 12 are provided with aligned pairs of knockout holes 13 which are initially filled by the blanks 14 (Fig. 5) which are provided with rectangular slots 15 for accommodating the end of a screw driver by means of which they may be removed or knocked out in a conventional manner. The bottom 11 of the box 10 is provided with pairs of like knockout holes 16 which are arranged adjacent to the knockout holes 13 and in alignment with the same. The knockout holes 16 are initially filled with knockout blanks 17 having rectangular slots 18.

The side walls 12 of the box 10 are also provided with punched out tongues 19 spaced outwardly of the knockout holes 13 and the bottom wall 11 of the box is provided with similar punched out tongues 20 spaced inwardly an equal distance from the knockout holes 16. The punched out tongues 19 and 20 are spaced an equal distance from the meeting line of the side and bottom walls 12 and 11 of the box.

As shown in Fig. 1, the outlet box 10 is designed to receive two connector members 21 positioned at the juncture of walls 11 and 12 and in opposed relation on opposite sides of the box. Each connector member 21 is angular in cross-section and comprises a plate-like base or attaching leg member 22 having a pair of laterally spaced tongues 23 which are preferably punched from the edge of the material with an angular end portion in generally parallel spaced relation to the plane of the base and which are adapted to be engaged in the slot 15 or 18 of the knockout blank 14 or 17, respectively, depending upon the position of the connector relative to walls 11 and 12.

The other leg 24 of the connector member 21 is provided with a pair of punched out spring fingers 25 which are adapted to engage a conduit, indicated at 26 (Figs. 2 and 3), which is passed through a knockout hole. The spring fingers 25 are integral with a transversely extending end portion 27 of the leg 24 and extend with their free ends towards the other leg or base member 22. The end portion or member 27 of the leg 24 is connected to the base plate 22 by a center strip member 28 which comprises a straight portion 29 extending at an angle to the base plate 22 and an inwardly curved portion 30 which extends from the portion 29 to the transverse end member 27 of the leg 24. The center strip 28 is of substantial width and supports the member 27 and the spring fingers 25 from the base plate 22. The curved portion 30 of the center strip 28 provides for resilient movement of the end member 27 when a conduit 26 is inserted between a finger 25 and the base plate 22. The spring fingers 25 are curved or bowed inwardly at 32 adjacent end member 27 and their outer or free end portions 33 are curved in the opposite direction and provided with serrations 34 on the lower surface. The serrations 34 may be provided by punching a plurality of slits arranged in parallel closely spaced relation transversely of the ends 33 of the spring fingers. The curved portions 32 of the fingers are preferably provided with a series of parallel elongated vertical slots 35 to increase the resiliency of the fingers. The base plate 22 is provided at the edge adjoining the leg 24 with tongues 36 bent into inverted V-shaped relation to provide ridges opposite tongues 25 for engagement with the conduit.

The connector member 21 is adapted to be inserted in the box 10 by inserting the tongues 23 in the slots 18 (Fig. 3) of the knockout plates 17 and springing the member sufficiently to insert the outer edge of leg 24 beneath the tongues 19. The connector is then in position to receive the conduit 26 inserted through the knockout hole 13 in the side wall 12 of the box. The connector 21 may also be positioned as in Fig. 5 with the tongues 23 in the slots 15 in the knockout plates 14 and the outer edge of leg 24 beneath the tongues 20 in position to secure a conduit in the knockout hole 16 in the bottom plate 11 of the box 10. In either position the conduit is engaged on opposite sides by the resilient tongues 25 and 36.

In Fig. 6 a modified form of box and connector is illustrated. In this form the box 40 is supplied with apertures 41 and 42 in the side wall 43 and bottom wall 44, respectively, and the connector member 45 is provided at the outer edge of the resilient tongue carrying leg with angular tongues 46 adapted to be inserted in the aperture 41 or 42 depending upon the position of the member 45. The box 40 and the member 45 are otherwise the same construction as the box 10 and the member 21 in the previously described form.

A further modification of the invention is illustrated in Figs. 7–9 of the drawings. The switch box 50 is of the type consisting of a generally U-shaped casing having a base or bottom plate 51 and end walls 52 combined with detachable side plates 53, which form side walls, only one such plate being shown. The bottom wall 51 and end walls 52 are provided with adjacent pairs of knockout holes 54 and 55, respectively. The box is provided with two conduit retaining clip or connector members 56 each of which is attached to the base 51 and an adjoining end wall 52 by insertion of the outer edges beneath punched out tongues 57 on the bottom wall and 58 on the end wall. The tongues 57 and 58 are spaced equal distances from the juncture of the bottom and end wall.

The connector member 56 comprises angularly related plate-like leg members 59 and 60. The member 60 is provided with a pair of curved spring tongue members 61 which are generally S-shaped and extend inwardly from a crossbar portion 62 which is provided with notches 63 along its opposite outer edge for engagement beneath the tongues 57 or 58 depending upon the position of the member 56. The crossbar 62 is connected to the opposite leg member 59 by a strap-like member or portion extending between the two tongues 61. The connecting member includes a curved portion 64 extending from the center of the bar 62 inwardly to and joined with a portion 65, which connects with the edge of the other leg 59 of the member. The tongues 61 are slotted at 66 to provide corrugations on the bottom surface and they are also slotted at 67 adjacent the crossbar 62 to reduce the section and provide more resiliency in the tongues. The straight portion 65 of the member connecting the crossbar 62 with the leg 59 is provided with a punched out tongue 67 adapted to resiliently urge the connector member away from the wall 52 of the box.

The leg 59 of the connector member 56 is provided at its outer margin with semi-circular cutouts or notches 68 to facilitate seating beneath the tongues 57. At points spaced inwardly from the outer margins of the leg 69 a pair of rectangular tongues 69 are punched out and turned upwardly in generally parallel relation with the leg 60. The tongues 69 are provided with apertures 70 for accommodating the conduit 71 in an armoured cable 72 while at the same time providing stops for the end of the metal shield of the cable. On the inner edges of the plate 59, opposite the tongues 61 reversely bent tongues 73 are provided for engaging the cable shield on the side opposite the tongues 61. The leg 59 is also provided with a punched out tongue 74 which is adapted to engage the base 51 of the box to resiliently urge the member 59 away from the same.

The connector member 60 is adapted to be positioned in the box 50 so that the tongues 61 will engage a conduit inserted through the knockout holes 55 or the connector member 56 may be reversed to clamp a conduit which is inserted through knockout holes 54, in the base 51 of the box.

The form of the invention shown in Figs. 7 to 10 is also applicable to an outlet box where the armoured cable is employed, the cable engaging and securing member being arranged in the same manner relative to the knockout holes in the box and the retaining tongues being provided in the proper location in the box.

While specific materials and details of construction have been referred to in the forms illustrated it will be understood that other materials and other details of construction may be resorted to within the spirit of the invention.

I claim:

1. In combination with an electrical connector box having side walls provided with knockout holes, a conduit retaining member comprising a plate of angular section having pairs of opposed resilient tongues, each tongue extending inwardly of a side edge of said plate for cooperation with an opposed tongue to engage in clamping relation a conduit on opposite sides of the same, and cooperating means on the said box walls and the side edges of said plate for securing said conduit retaining member in said box with each pair of said tongues in alignment with a knockout hole.

2. In combination with an electrical connector box having side walls provided with pairs of knockout holes, a conduit retaining member comprising a plate of angular section having pairs of opposed resilient tongues, each tongue extending inwardly of a side edge of said plate for cooperation with an opposed tongue to engage in clamping relation a conduit on opposite sides of the same, and cooperating interengaging means on the said side walls and adjacent the side edges of said plate for selectively securing said conduit retaining member in said box with the pairs of tongues in alignment with the knockout holes.

3. In combination with an electrical connector box having side walls provided with knockout holes, a conduit retaining means comprising a plate of angular section having opposed resilient tongues extending inwardly of the side edges of said plate for engaging on opposite sides of a conduit to secure the same in clamping relation therebetween, cooperating interengaging means on the said box walls and the edges of said plate for securing said conduit retaining means in said box with pairs of said tongues in alignment with a knockout hole and resilient means projecting outwardly of said plate for engagement with the walls of said box to resiliently urge said plate away from said walls.

4. In an electrical outlet box having adjoining side and bottom walls each provided with apertured knockout holes, punched out retaining tongues in said walls arranged in inwardly spaced relation to said knockout holes and a conduit retaining member arranged at the juncture of said walls, said retaining member having resilient means for engaging in clamping relation an electrical conduit passing through a knockout hole, and said retaining member being held in position in said box by means including said punched out retaining tongues.

5. In an electrical outlet box having adjoining side and bottom walls each provided with apertured knockout holes and spaced punched out retaining tongues arranged in inwardly spaced relation to said knockout holes, a conduit retaining member of angular section arranged at the juncture of said walls, said retaining member having resilient means for engaging in clamping relation an electrical conduit, said retaining member having offset tongues along one edge thereof adapted to engage in the apertures in the knockout holes in one of said walls, the opposite edge of said retaining member being engageable beneath said punched out tongues in the other of said walls, and said retaining member being so constructed that it may be selectively positioned to clamp a conduit passing through a knockout hole in either a side or the bottom of said box.

6. In an electrical outlet box having adjoining walls provided with aligned pairs of spaced knockout holes adjacent the juncture of said walls, a conduit retaining means comprising a plate-like member having angularly related leg portions, said leg portions having cooperating pairs of resilient tongues arranged in spaced relation longitudinally of said member, one tongue of each pair extending from adjacent the outer edge of one of said leg portions toward the other one of said leg portions and forming a reversely bent clamping member, the other tongue of each pair extending from the other leg portion adjacent the juncture of said leg portions and forming a cooperating clamping member, and means for securing said retaining means in said outlet box with said pairs of tongues aligned with said pairs of knockout holes whereby a conduit passing through one of said knockout holes is engaged in clamping relation by a pair of said tongues.

7. In an electrical outlet box having adjoining walls provided with aligned pairs of spaced knockout holes adjacent the juncture of said walls, a conduit retaining means comprising a plate-like member having angularly related leg portions, one of said leg portions having spaced resilient tongues arranged at opposite ends, each tongue being reversely bent and extending from adjacent the outer edge of said leg portion toward the other one of said leg portions, the other one of said leg portions having relatively short inverted V-shaped resilient tongues arranged in opposed relation to the tongues on the first mentioned leg portion and cooperating therewith to form conduit clamping members, and means for securing said retaining means in said outlet box with said cooperating tongues aligned with said knockout holes.

8. In an electrical connector box having adjoining walls provided with aligned pairs of knockout holes adjacent the juncture of said walls, a conduit retaining means comprising two angularly related plate-like members each having resilient clamping tongues arranged at opposite ends thereof, the tongues on one plate-like member being relatively long and extending from adjacent the outer edge of one of said plate-like members toward the other one of said plate-like members, the tongues on the other plate-like member being relatively short and arranged in cooperating opposed relation with the first mentioned tongues, and means for securing said retaining means in said box with said cooperating tongues aligned with said knockout holes.

9. In an electrical connector box as recited in claim 8 and apertured stop means on said other plate-like member in aligned relation with said tongues.

10. In an electrical connector box as recited in claim 8 and said means for securing said retaining means in said box comprising resilient punched out tongues on said plate-like members engaging the walls of said box.

11. In an electrical connector box having adjoining walls provided with aligned pairs of knockout holes adjacent the juncture of said walls, a conduit retaining means, said means comprising angularly related plate-like members having resilient tongues extending inwardly of the outer edges of said plate-like members toward the juncture of said plate-like members and forming pairs of cooperating clamping members, said retaining means being adapted to be secured in said outlet box with said pairs of clamping members aligned with said knockout holes.

12. In an electrical connector box as recited in claim 11 wherein one of each pair of said tongues is relatively long and of S-shaped section, the free end of the same being provided with corrugations.

13. In an electrical connector box as recited in claim 12 wherein the other end of each of said tongues is slotted to increase the resiliency of said tongue.

ISAAC A. PAIGE.

REFERENCES CITED

The following references are of record in the file of this patent:

UNITED STATES PATENTS

| Number | Name | Date |
|---|---|---|
| 2,301,776 | Goetzelman | Nov. 10, 1942 |
| 2,444,092 | Clayton | June 29, 1948 |
| 2,457,235 | Hoehn | Dec. 28, 1948 |